United States Patent [19]
Scriber et al.

[11] Patent Number: 5,572,718
[45] Date of Patent: Nov. 5, 1996

[54] MECHANISM FOR DYNAMICALLY DETERMINING AND DISTRIBUTING COMPUTER SYSTEM CLOCKS

[75] Inventors: Mike Scriber, North Plains; Bruce Young, Tigard, both of Oreg.

[73] Assignee: Intel Corporation, Santa Clara, Calif.

[21] Appl. No.: 259,472

[22] Filed: Jun. 14, 1994

[51] Int. Cl.⁶ .................................................. G06F 1/04
[52] U.S. Cl. ..................... 395/555; 364/270; 364/271; 364/271.1; 364/DIG.1
[58] Field of Search ................................. 395/550, 500; 364/270, 271, 271.1

[56] References Cited

U.S. PATENT DOCUMENTS

| | | | |
|---|---|---|---|
| 5,305,452 | 4/1994 | Khan et al. | 395/550 |
| 5,448,715 | 9/1995 | Lelm et al. | 395/550 |
| 5,450,574 | 9/1995 | Madter et al. | 395/550 |
| 5,450,958 | 9/1995 | Price et al. | 375/356 |
| 5,455,927 | 10/1995 | Huang | 395/550 |

*Primary Examiner*—Thomas M. Heckler
*Assistant Examiner*—Dennis M. Butler
*Attorney, Agent, or Firm*—Owen L. Lamb

[57] ABSTRACT

A computer includes a mother board having a clock A thereon that provides a primary clock to a clock distribution buffer that distributes the clock that drives it to clock electronic components on the mother board. The mother board has a socket for receiving an optional module having a clock B thereon. A clock switching circuit is connected to the clock A and to the clock B socket terminus. An edge detector connected to clock B detects an edge of the clock B. A detection window indicator is asserted upon a predetermined condition, such as that power is on and stable. A control circuit, connected to the clock switching circuit, to the edge detector and to the detection window indicator causes the secondary clock to be selected and substituted for the primary clock.

20 Claims, 4 Drawing Sheets

MECHANISM FOR DYNAMICALLY DETERMINING AND DISTRIBUTING COMPUTER SYSTEM CLOCKS

BACKGROUND OF THE INVENTION

1. Field of the Invention

The present invention is related to personal computers and more particularly to a method and apparatus for determining and distributing computer system clocks.

2. Background Art

The flow of information through the internal circuits of a computer is synchronized by an electronic circuit called a clock that generates evenly spaced timing pulses at high speeds. IBM compatible personal computer (PC) systems are designed in a fully synchronous fashion with each component of the system being driven by a common clock. This requires distribution of a large number of low-skew clock signals throughout the system. In those circumstances where there are several clock speed choices a method of choosing the proper clock is provided.

The main hardware part of a personal computer (PC) is called a mother board which is a large printed circuit board that has plugged into it the computer's central processing unit (CPU), which is an INTEL brand or compatible microprocessor, memory, input/output (I/O) control, and microprocessor support chips. The mother board has expansion slots that receive add-in cards that plug into the expansion slots. The IBM PC architecture uses a MICROSOFT brand disc operating system (DOS) as the software program that controls the overall operation of the computer by instructing the computer what to do and when to do it.

A clock is provided on the mother board that runs at a speed that is appropriately matched to the speed of the central processing unit (CPU) that is plugged into the motherboard. If a socket is provided on the motherboard for a future CPU upgrade or other upgrade, an optional module can be plugged in. The module may contain a CPU that operates at a different and perhaps higher speed than the CPU that was originally supplied on the mother board. In this circumstance, the clock distribution circuitry on the mother board must be switched to the new clock.

The most common way of switching clocks is manually by human intervention. The person configuring the system is instructed to shut off power to the computer and to insert appropriate jumper wires on the mother board that select he proper clock. This method is subject to human error and cannot be performed automatically when the computer is turned on.

It is therefore an object of this invention to provide a method and apparatus to cause a PC motherboard to automatically detect that a new clock is present and configure itself appropriately to distribute the new clock.

SUMMARY OF THE INVENTION

Briefly, the above object is accomplished in accordance with the invention by providing a mother board having a clock A thereon. The mother board has a socket with a clock B terminus for receiving an optional module having a clock B thereon. A clock switching circuit is connected to an output of clock A and to the clock B socket terminus that has an output of clock B connected to it. A clock switching circuit control is connected to a control line that signals clock A or clock B. An edge detector connected to clock B detects an edge of the clock B. A detection window indicator is asserted upon a predetermined condition after power is on and stable. A gate, connected to the edge detector and to the detection window indicator, gates the detected edge of clock B to the clock switching circuit control encoder. A clock distribution buffer is connected to a clock output of the clock switching circuit.

An advantage of this invention is that when a new module is inserted, logic on the motherboard automatically detects whether the module has a clock or not. If it does have a clock, switching logic selects and distributes that clock; otherwise it distributes the motherboard's clock. This eliminates the need for human intervention to select the appropriate clock.

The foregoing and other objects, features, and advantages of the invention will be apparent from the following more particular description of a preferred embodiment of the invention as illustrated in the accompanying drawings.

DESCRIPTION OF THE PREFERRED EMBODIMENT

Figure 1:
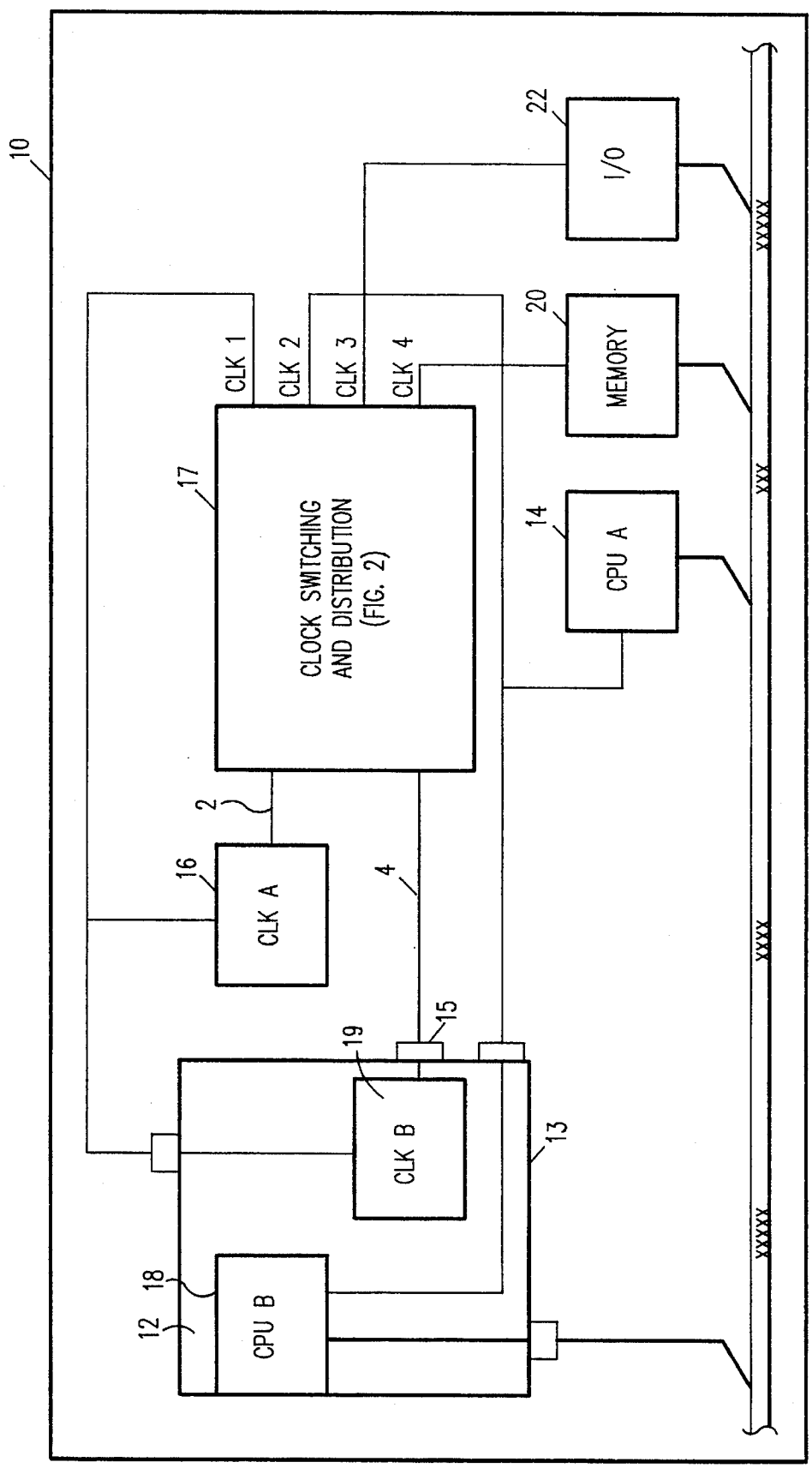
FIG. 1 is a diagram of a personal computer mother board in accordance with the present invention.

Refer to FIG. 1. A mother board (10) is installed in a personal computer case. The computer operates with a central processing unit (CPU), CPU A (14). The mother board CPU (14) is designed to run at a primary clock frequency, clock A, that is generated by a primary clock (16). The computer is also designed to operate with an optional central processing unit (CPU), CPU B (18) that is mounted on an optional module (12) that plugs into a socket (13) on the mother board (10). The optional CPU B (18) is designed to run at a secondary clock frequency, clock B, that is generated by a secondary clock (19).

The mother board (10) includes a socket (13) for receiving the optional module (12). The socket has a clock B socket terminus (15). A clock switching and distribution circuit (17), shown in more detail in FIG. 2, is connected to the socket terminus and to clock A.

Figure 2:
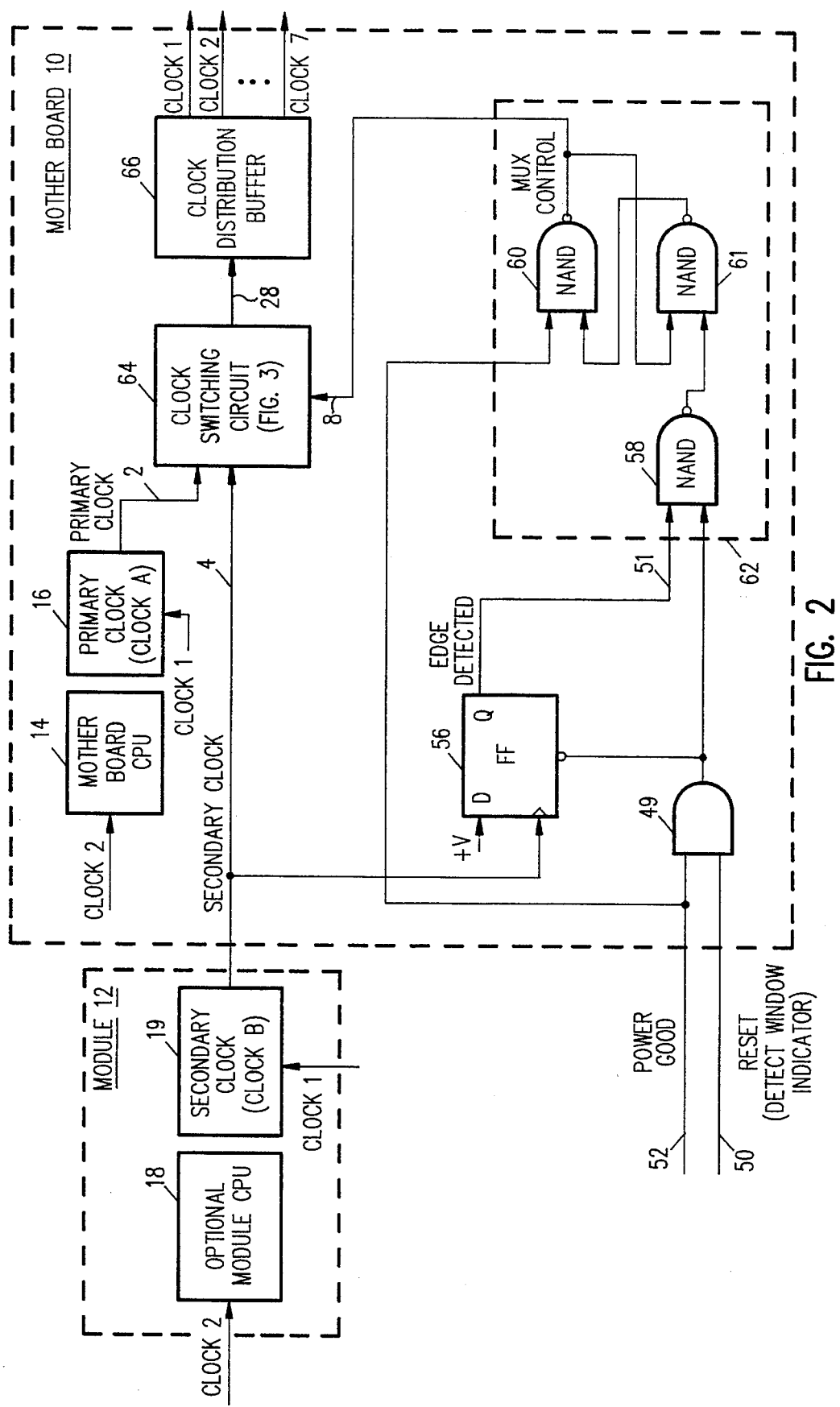
FIG. 2 is a diagram of the clock switching and distribution circuit shown in FIG. 1.

In the circuit of FIG. 2, when an optional module (12) is inserted into a socket on the mother board, during a boot an automatic clock switching and detection logic on the mother board automatically detects whether the module has a clock (a secondary clock) on it or not. If the module has a clock, a control circuit (62) drives the control line (8) with a value which causes the clock switching circuit (64) to select the secondary clock output (4). The clock output (28) of the clock switching circuit (64) is the secondary clock in place of the mother board's primary clock.

At the time power is switched on, logic detects the presence of a module clock and automatically switches to that clock. This causes the clock switching circuit (64) to change if a clock on the module is detected at the time power is turned on. The circuit to provide this automatic clock switching circuitry consists of a clock distribution buffer

(66) which is fed by the clock switching circuit (64) which can switch between two clock inputs, clock A and clock B. Edge detection circuitry on the secondary clock input (4) is used to automatically control which clock is sent to the clock distribution buffer. Power good (52) is a signal that is asserted after power is good and stable. Detect window indicator (50) is a signal that is asserted when reset is asserted. It will be understood by those skilled in the art that the detect window indicator (50) may be any signal that indicates a time-to-switch-clocks condition that may be specified by hardware, such as the reset signal shown in the embodiment of FIG. 2, or a signal asserted by a condition specified in software by a programmer.

Power good (52) and detect window indicator (50) are anded in an AND circuit (49). A flip-flop (56) has an active low reset input that is initially reset by the output of AND (49). The rising edge of clock B (4) triggers the flip-flop which causes the output thereof, Clock Edge Detected, to be asserted. The Clock Edge Detected line (51) is an input to the NAND (58) portion of a control encoder (62). The other input to the NAND (58) is the output of AND (49) which is the logical and of power good and the detection window indicator (50).

Control line (8) signals clock A or clock B to clock switching circuit (64). Edge detector (56) connected to clock B detects a rising edge of clock B. The edge detector may be, for example, a flip-flop (FF) that is set by the rising edge of clock B (4), and reset by a not power good signal (52) or not detection window indicator that is asserted upon a condition that power is on and stable. A detection window indicator, reset line (50), is asserted after power is on and stable. A NAND gate (58) is connected to the edge detected output (51) of the edge detector (56) and to AND gate (49) which is connected to the reset line (50) which is the Detection Window Indicator, and to the power good line (52). An AND circuit asserts an output if all of its inputs are asserted. A NAND circuit asserts its output if any one of its inputs is unasserted.

The detect window indicator, reset line (50), and the power good line (52) prevent the latch (60, 61) from becoming asserted until the predetermined condition is met. The power good line (52) when unasserted (not power good) sets the latch (60, 61) to its initial condition.

A clock distribution buffer (66) connected to a clock output of the clock switching circuit (64) distributes the clock signals to memory (20) and input/output (I/O) logic (22) on the mother board.

The circuit details of the computer system of FIG. 1 are shown in FIG. 2. When a user turns a computer power switch on, or presses a reset button, the computer "boots" itself, a term that is shorthand for pulling itself up by the bootstraps. Booting initiates an automatic start program routine that clears memory, does some diagnostics, loads a computer operating system software program into memory from disk storage and does other routines that prepare the computer for use.

Figure 3:
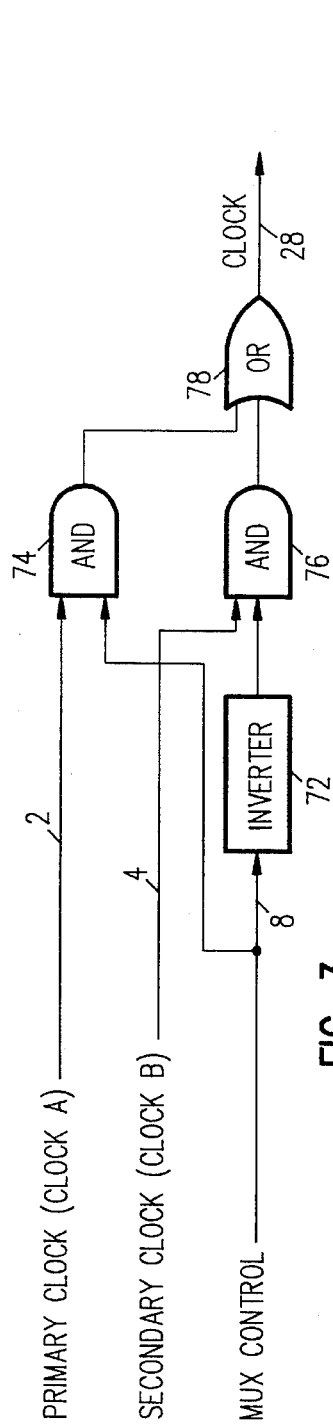
FIG. 3 is a diagram of the clock switching circuit shown in FIG. 2.

Refer to FIG. 3 which is a diagram of the clock switching circuit (64) shown in FIG. 2. The MUX control line (8) drives inverter (72) which drives AND (76). The outputs of AND (74) and AND (76) drive OR (78). The output of OR (78) is the clock output (28). This circuit is a very simple multiplexor (MUX) that switches between the primary clock and the secondary clock depending upon the state of the output of the control encoder (62). When the MUX control (8) is asserted, the primary clock is gated through the OR (78), the output of which is the clock (28). When the MUX control (8) is unasserted, the output of inverter (72) is asserted, causing the secondary clock to be gated to the OR (78). Since this particular circuit may result in glitches (unwanted, spurious signals) on the clock output, a more preferable circuit is that shown in U.S. Pat. No. 5,483,185 granted on Jan. 9, to Mike Scriber and Jim Warren filed on Jun. 9, 1994.

Figure 4:
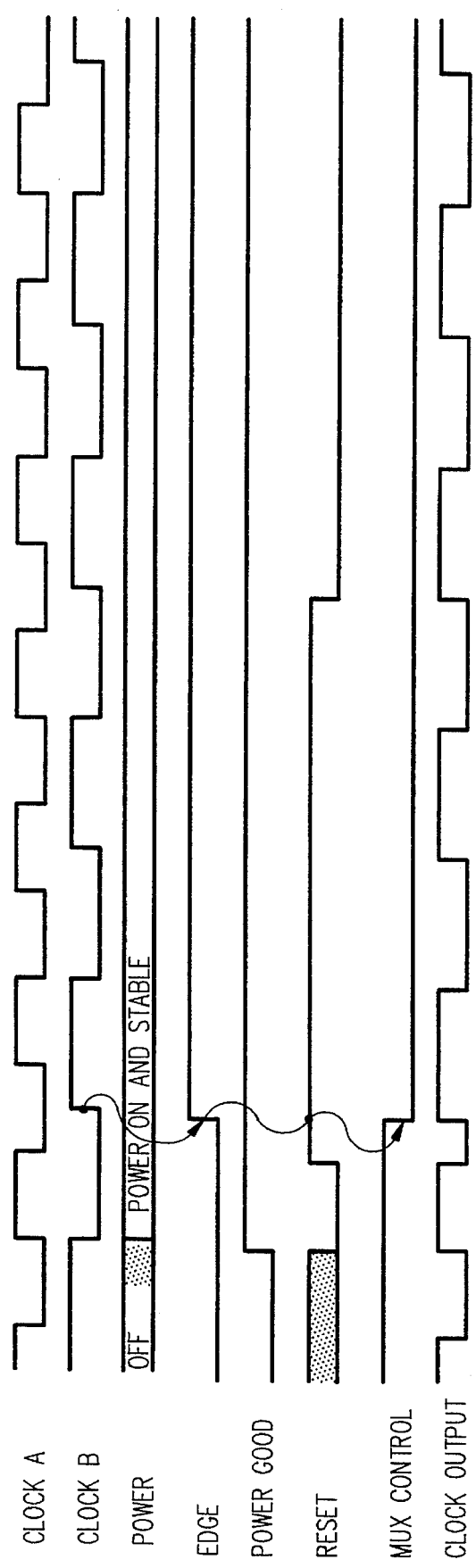
FIG. 4 is a timing diagram of the operation of the invention.

Refer to FIG. 4 which is a timing diagram of the operation of the circuit of FIG. 2. When power is turned on, the clock switching circuit (64) passes the primary clock (2) to clock distribution buffer (66). It continues to pass the primary clock until it sees a positive going edge on the secondary clock (4) while the Detection Window indicator (50) is active. The secondary clock continues to be selected as long as the power good signal is active. Those skilled in the art will understand that the selection can be made to change back to the primary clock by events other than the power good signal.

The edge detector flip-flop (56) detects the edge of the secondary clock. It is important that the edge detector FF be held clear until power is up and stable. The detection window indicator defines a period of time during which clock switching is allowable.

The preferred embodiment utilizes a single signal (RESET) to generate the Detection Window Indicator. The primary clock is shown as clock A, and the secondary clock is shown as clock B in FIG. 3. The power is shown as initially off, then being turned on at the shaded portion eventually becoming on and stable. The power good input signal becomes active at this time. The RESET input after power is on and stable goes active. The clock output continues to track the primary clock until a rising edge of the secondary clock occurs concurrently with the detection window Indicator being active. The rising edge of the secondary clock then causes the MUX control line (8) to generate a signal specifying the secondary clock (clock B). When the MUX control line (8) signals a change from clock A to clock B, the clock outputs switch over to the secondary clock after delays encountered through the clock switching circuit. When the reset signal, the detection window indicator (50) goes inactive, the MUX control line doesn't change until the power good signal goes inactive. If a positive edge of the secondary clock is not detected during the detection window indicator (50) being active, then the primary clock will continue to be selected at the clock switching circuit (64) by the MUX control (8).

Figure 5:
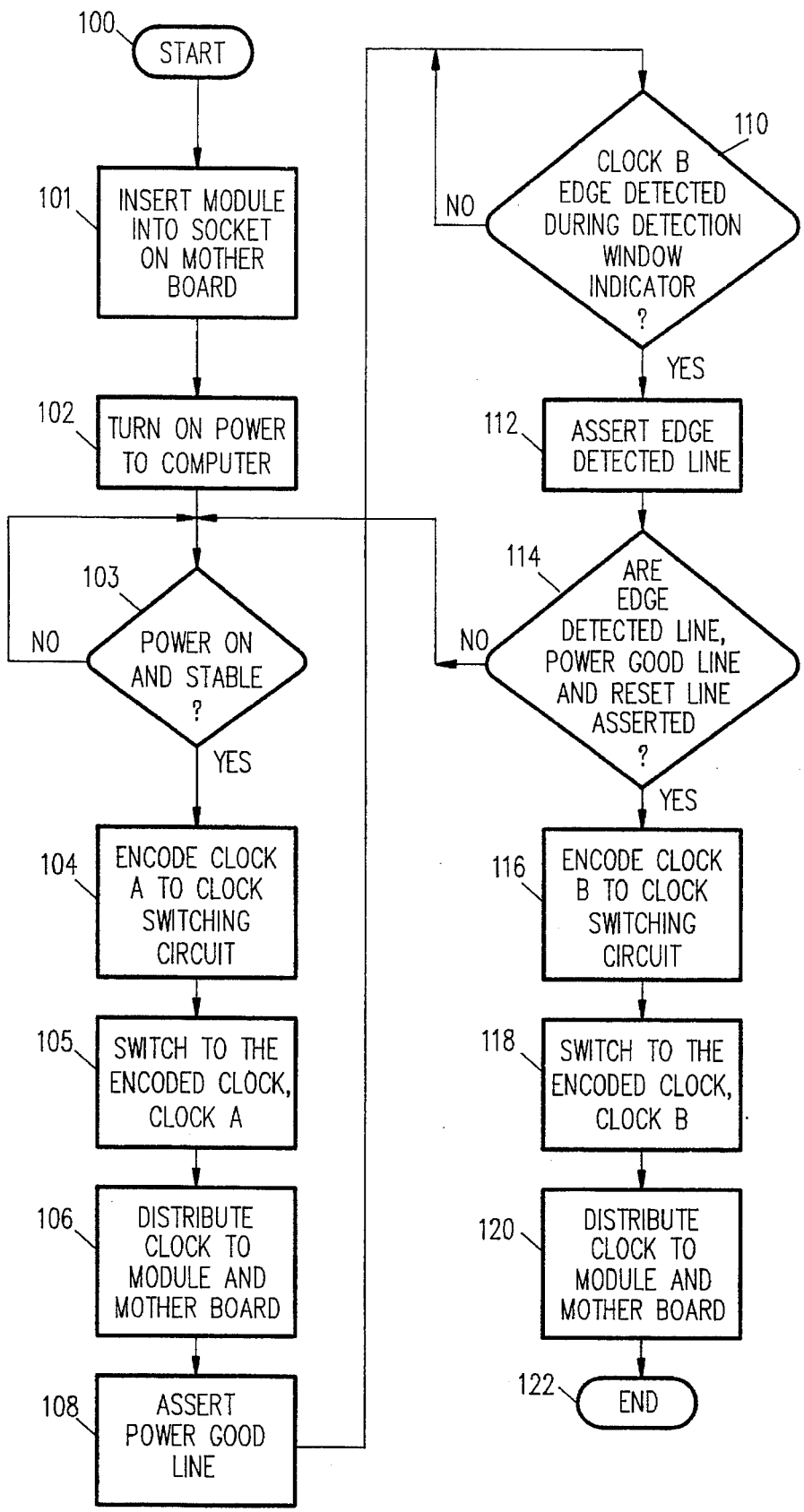
FIG. 5 is a flow diagram of a method of clock switching and distribution in accordance with the invention.

FIG. 5 is flow chart of a method of automatically switching clocks when a module is inserted into a mother board. The user inserts the module into the mother board (101) and turns on the power to the computer (102). A check is made to see if power is on and stable (103). If yes, then clock A is encoded to the clock switching circuit (104). The logic then switches to the encoded clock, clock A (105). The clock is then distributed (106) to logic on the mother board and logic on the module. Power good is asserted upon a condition that power is on and stable (108). If an edge of clock B is detected at clock B socket terminus (110), an edge detected line is asserted (112). If edge detected, power good and detection window indicator are asserted (114), then clock B is encoded to the clock switching circuit (116). The logic then switches to the encoded clock, clock B (118). The clock is then distributed (120) to logic on the mother board and logic on the module and the flow ends (122).

While the invention has been particularly shown and described with reference to preferred embodiments thereof, it will be understood by those skilled in the art that the foregoing and other changes in form and detail may be made therein without departing from the scope of the invention.

What is claimed is:

1. An apparatus for automatically selecting a clock during a power on sequence of a computer comprising:

a mother board having a clock A thereon;

said clock A having a clock A output;

a module having a clock B thereon;

said clock B having a dock B output;

said mother board including a socket for receiving said module;

said socket having a clock B socket terminus connected to said clock B output;

a clock switching circuit having a clock output;

said clock switching circuit being connected to said clock A output and to said clock B socket terminus;

a control line;

said clock switching circuit being connected to said control line;

said clock switching circuit causing said clock B output to be gated to said clock output upon a condition that said control line is asserted;

an edge detector connected to said clock B socket terminus;

said edge detector asserting an edge detected output upon a condition that an edge of said clock B output occurs;

a detection window indicator;

said detection window indicator being asserted upon a predetermined condition that occurs in response to power on; and, a control circuit connected to said control line, to said edge detected output and to said detection window indicator;

said control circuit asserting said control line upon a condition that said edge detected output is asserted during a time said detection window indicator is asserted.

2. The combination in accordance with claim 1 wherein:

said predetermined condition occurs in response to power being on and stable.

3. The combination in accordance with claim 1 wherein:

said predetermined condition occurs in response to power being on and stable and a time-to-switch-clocks condition.

4. The combination in accordance with claim 1 wherein: a clock distribution buffer is connected to a clock output of said clock switching circuit.

5. The combination in accordance with claim 2 wherein: a clock distribution buffer is connected to a clock output of said clock switching circuit.

6. The combination in accordance with claim 3 wherein: a clock distribution buffer is connected to a clock output of said clock switching circuit.

7. An apparatus for automatically selecting a clock during a power on sequence of a computer comprising:

a mother board having a clock A thereon;

said clock A having a clock A output;

a module having a clock B thereon;

said clock B having a clock B output;

said mother board including a socket means for receiving said module;

said socket means having a clock B socket terminus connected to said clock B output;

a clock switching means for switching between clock A and clock B;

said clock switching circuit having a clock output;

said clock switching means being connected to said clock A output and to said clock B socket terminus;

control line means;

said clock switching means being connected to said control line means;

said clock switching means causing said clock B to be selected upon a condition that said control line is asserted;

edge detector means connected to said clock B socket terminus for asserting an edge detected output upon a condition that an edge of said clock B occurs;

a detection window indicator;

said detection window indicator being asserted upon a predetermined condition that occurs in response to power on; and, control means connected to said control line, to said edge detected output and to said detection window indicator;

said control means including means for asserting said control line upon a condition that said edge detected output is asserted during a time said window indicator is asserted.

8. The combination in accordance with claim 7 wherein:

said predetermined condition occurs in response to power being on and stable.

9. The combination in accordance with claim 7 wherein:

said predetermined condition occurs in response to power being on and stable and a time-to-switch-clocks condition.

10. The combination in accordance with claim 7 wherein:

a clock distribution buffer is connected to a clock output of said clock switching circuit.

11. The combination in accordance with claim 8 wherein:

a clock distribution buffer is connected to a clock output of said clock switching circuit.

12. The combination in accordance with claim 9 wherein:

a clock distribution buffer is connected to a clock output of said clock switching circuit.

13. A method comprising steps of:

A. receiving a module having a clock B thereon into a socket on a mother board having a clock A thereon;

B. supplying an output of said clock B to a clock B socket terminus of said socket;

C. detecting an edge of said clock B at an edge detector connected to said clock B socket terminus;

D. generating a detected edge signal of clock B in response to said step of detecting an edge of said clock B;

E. asserting a detection window indicator upon the occurrence of a predetermined condition that occurs in response to power on;

F. gating said detected edge signal of clock B to a clock switching circuit connected to said clock A and to said clock B socket terminus upon a condition that said detection window indicator is asserted; and, G. switching said output of said clock B to a clock output of said clock switching circuit in response to said gated detected edge signal of clock B.

14. The method in accordance with claim 13 wherein said predetermined condition of step E is specified by power being on and stable.

15. The method in accordance with claim 13 further wherein said predetermined condition of step E is specified by power being on and stable and a time-to-switch-clocks condition.

16. The method in accordance with claim 13 further comprising a step of:

H. distributing said clock output of said clock switching circuit to logic on said mother board and logic on said module.

17. The method in accordance with claim 14 further comprising a step of

H. distributing said clock output of said clock switching circuit to logic on said mother board and logic on said module.

18. The method in accordance with claim 15 further comprising a step of:

H. distributing said clock output of said clock switching circuit to logic on said mother board and logic on said module.

19. A timing apparatus comprising:

a mother board having a first microprocessor and a primary clock;

said primary clock having a primary clock output;

a module having a second microprocessor and a secondary clock;

said secondary clock having a secondary clock output;

a clock switching circuit having a clock output;

said clock switching circuit being connected to said primary clock output and to said secondary clock output;

a control line;

said clock switching circuit being connected to said control line;

said clock switching circuit selecting said secondary clock output for delivery to said clock output upon a condition that said control line is asserted;

an edge detector connected to said secondary clock output;

said edge detector asserting an edge detected output upon a condition that an edge of said secondary clock output occurs;

a detection window indicator;

said detection window indicator being asserted upon a predetermined condition that occurs in response to power on; and, a control circuit connected to said control line, to said edge detected output and to said detection window indicator;

said control circuit asserting said control line upon a condition that said edge detected output is asserted during a time said detection window indicator is asserted.

20. The combination in accordance with claim 19 wherein:

said predetermined condition occurs in response to power being on and stable.

* * * * *